United States Patent
Mainini

(10) Patent No.: US 9,307,745 B2
(45) Date of Patent: *Apr. 12, 2016

(54) SYSTEMS AND METHODS OF DESENSITIZING AN ANIMAL TO ANXIETY-INDUCING EVENTS

(71) Applicant: Radio System Corporation, Knoxville, TN (US)

(72) Inventor: Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/938,835

(22) Filed: Jul. 10, 2013

(65) Prior Publication Data

US 2013/0298846 A1 Nov. 14, 2013

Related U.S. Application Data

(63) Continuation-in-part of application No. 12/917,221, filed on Nov. 1, 2010, now Pat. No. 8,505,494.

(51) Int. Cl.
*A01K 37/00* (2006.01)
*A01K 15/02* (2006.01)

(52) U.S. Cl.
CPC ............... *A01K 15/02* (2013.01); *A01K 15/021* (2013.01)

(58) Field of Classification Search
USPC .......... 119/712, 719, 905, 718, 908, 720, 702
See application file for complete search history.

(56) References Cited

U.S. PATENT DOCUMENTS

| | | | | |
|---|---|---|---|---|
| 3,099,248 A * | 7/1963 | Giles et al. | ................... | 119/712 |
| 5,061,918 A * | 10/1991 | Hunter | ...................... | 340/573.2 |
| 5,239,943 A * | 8/1993 | Kim | ........................... | 119/51.12 |
| 5,749,324 A * | 5/1998 | Moore | ........................ | 119/719 |
| 6,206,142 B1 * | 3/2001 | Meacham | .................... | 187/392 |
| 6,273,027 B1 * | 8/2001 | Watson et al. | ................ | 119/712 |
| 6,651,592 B2 * | 11/2003 | Maddox et al. | ............... | 119/720 |
| 6,694,916 B1 * | 2/2004 | Rucker et al. | ............. | 119/51.01 |
| 7,861,676 B2 * | 1/2011 | Kates | ........................... | 119/720 |
| 2010/0275851 A1 * | 11/2010 | Yin | ............................ | 119/51.02 |
| 2011/0017150 A1 * | 1/2011 | Caputo et al. | ................ | 119/719 |

OTHER PUBLICATIONS

How to Desensitize a Scared Dog, by Linda Cole, Responsible Pet Ownership Blog, Oct. 29, 2012 [retrieved from internet Oct. 15, 2012].*

* cited by examiner

*Primary Examiner* — Andrea Valenti
(74) *Attorney, Agent, or Firm* — Pitts & Lake, P.C.

(57) ABSTRACT

Systems and methods of desensitizing an animal to an anxiety inducing event, including an output unit to communicate with a media player to output a conditioning media signal and an anxiety inducing media signal, a conditioning element dispenser to dispense a conditioning element, a detector to determine when an animal has taken the conditioning element, and a control module to selectively control operation of the output unit and the conditioning element dispenser to cause the conditioning element dispenser to dispense a first conditioning element in association with the media player outputting the conditioning media signal. The output unit can cause the media player to output the anxiety inducing media signal in association with the conditioning media signal, and the control unit can cause the conditioning element dispenser to dispense a second conditioning element from the conditioning element dispenser in association with the anxiety inducing media signal.

18 Claims, 3 Drawing Sheets

SYSTEMS AND METHODS OF DESENSITIZING AN ANIMAL TO ANXIETY-INDUCING EVENTS

CROSS-REFERENCE TO RELATED APPLICATIONS

This application is a continuation-in-part of U.S. patent application No. 12/917,221, filed on Nov. 1, 2010, the contents of which are incorporated by reference herein in its entirety.

BACKGROUND

1. Field of the Inventive Concept

The present general inventive concept relates to a system to desensitize an animal to an anxiety-inducing event, and more particularly relates to systems and methods of reducing the anxiety felt by an animal after being exposed to an anxiety-inducing event.

2. Description of the Related Art

Approximately 20-50% of pets develop an anxiety or fear associated with a particular sensation (e.g., sight and/or sound), such as thunder/lightning, gunfire, car backfire, fireworks, and various other sudden and intense audio/visual sensations. One of the first biological reactions to such an anxiety is the rejection of food and/or treats. Other reactions to such an anxiety include panting, pacing, trembling, hiding, barking, and/or becoming aggressive and/or destructive. When such an anxiety goes untreated, the continuing reactions by the pet result in an unhappy and potentially unhealthy animal.

Conventional treatments for anxiety associated with a particular audio or video sensation include strong sedatives prescribed by a veterinarian. Drawbacks to sedatives include cost, side effects, incapacitation of the pet, and injury associated therewith. Additionally, although sedatives can be administered to a pet prior to, for example, an impending storm, many anxiety-causing occurrences are unpredictable and sudden such that sedating a pet prior to the onset of anxiety is not possible.

A more extreme method for desensitizing a pet to a particular sensation requires a pet owner to conduct therapy sessions multiple times a day on an ongoing basis. One such conventional method is detailed at www.scarednomore.com. Although the obvious limitation of such a method is inconvenience for the pet owner, an additional limitation is the effect of the pet owner on the pet. More specifically, in treating anxiety, pets take cues from the owner's behavior, and treating the pet is more effective when the pet is not exposed to these cues. Consequently, a method and device for desensitizing a pet to a particular sensation and for minimizing the active involvement of a pet owner in such desensitization is desired.

BRIEF SUMMARY

Example embodiments of the present general inventive concept can be achieved by providing a method of desensitizing an animal to an anxiety inducing event, including providing an output unit to communicate with a media player to cause the media player to output a conditioning media signal and an anxiety inducing media signal, providing a conditioning element dispenser to dispense a conditioning element, providing a detector to determine when an animal has taken the conditioning element, and providing a control module to selectively control operation of the output unit and the conditioning element dispenser to cause the conditioning element dispenser to dispense a first conditioning element in association with the media player outputting the conditioning media signal, and when the detector determines that the animal has taken the first conditioning element, the output unit causes the media player to output the anxiety inducing media signal in association with the conditioning media signal, and the control unit causes the conditioning element dispenser to dispense a second conditioning element from the conditioning element dispenser in association with the anxiety inducing media signal.

The control unit can cause the media player to output an anxiety inducing media signal before the first conditioning element is dispensed.

The output unit, media player, conditioning element dispenser, detector, and controller can be formed as an integrated unit, or as separate units or various combinations of units.

The output unit can include a communication unit to communicate with an external media player via a wired and/or wireless connection.

The communication unit can be configured to communicate with the external media player over a network.

The controller can be configured to generate training data corresponding to operation of the media player and the conditioning element, and the communication unit can be configured to communicate the training data to a remote user over the network.

The control module can be configured to cause the media player to modify an intensity of the anxiety inducing media signal when the detector determines that the animal has taken the conditioning element.

The control module can activate the conditioning element dispenser to dispense a third conditioning element in association with the modified anxiety inducing media signal.

The control module can cause the media player to modify the intensity of the anxiety inducing media signal when the detector determines that the animal has not taken the third conditioning element.

The control module can end a training session when the control module modifies the intensity of the anxiety inducing sound beyond a predetermined level. A new training session can be activated a predetermined time after the previous training session has been terminated.

A receptacle can be disposed with respect to the conditioning element dispenser to receive dispensed conditioning elements.

The detector determines whether the animal has taken a dispensed conditioning element by measuring a volume and/or weight of conditioning element corresponding to the conditioning element dispenser.

Example embodiments of the present general inventive concept can also be achieved by providing a system to perform a method of desensitizing an animal to an anxiety inducing event, including a conditioning element dispenser to dispense a conditioning element, a detector to determine if the animal has taken a dispensed conditioning element, a media signal generator to provide a conditioning media signal and an anxiety inducing media signal, the anxiety inducing media signal corresponding to an anxiety inducing event, a communication unit to communicate with a media player, and a control module to control operation of the media player and the conditioning element dispenser, the control module configured to instruct the media player to output the conditioning media signal and the conditioning element dispenser to dispense a first conditioning element, and when the detector determines that the animal has taken a dispensed conditioning element, the control module is configured to instruct the media player to output the anxiety inducing media signal in association with the conditioning media signal, and to instruct the conditioning element dispenser to dispense a second conditioning element from the conditioning element dispenser in association with the anxiety inducing media signal.

The external media player can be a stereo system, audio system, radio system, home theatre system, television system, video system, or combination thereof.

The communication unit can be connected to the external media player via a wired or wireless connection, including but not limited to a radio frequency (RF) modulator and/or RF transmitter.

The system can include an activation switch to cause the control module to instruct the media player to output the conditioning media signal and the conditioning element dispenser to dispense a conditioning element.

At least one of the conditioning media signal and the anxiety inducing media signal can be an audio signal, a video signal, or combination thereof The media signal generator can include a recording device to record the anxiety inducing media signal.

The conditioning media signal and/or the anxiety inducing media signal can be provided from a personal media device and/or from an internet source.

BRIEF DESCRIPTION OF THE DRAWINGS

The above-mentioned features of the present general inventive concept will become more clearly understood from the following detailed description read together with the example embodiment drawings in which.

DETAILED DESCRIPTION

The present general inventive concept provides counter-conditioning systems and methods of desensitizing an animal to an anxiety-inducing sensation and minimizing a user's active involvement in such desensitization. The example systems and methods enable conditioning of an animal that exhibits anxiety in response to the occurrence of a particular event (e.g., sound, vision, audio, video) such that the animal learns to anticipate a conditioning element (e.g., treat or toy or other reward) upon the occurrence of the event. The event can be reproduced on a media, such as audio or video media, for delivery to the animal for training purposes. The training system can perform the noise desensitizing conditioning such that a user is not actively involved in the training process and the user is not required to invest extensive amounts of time to the training.

Figure 1:
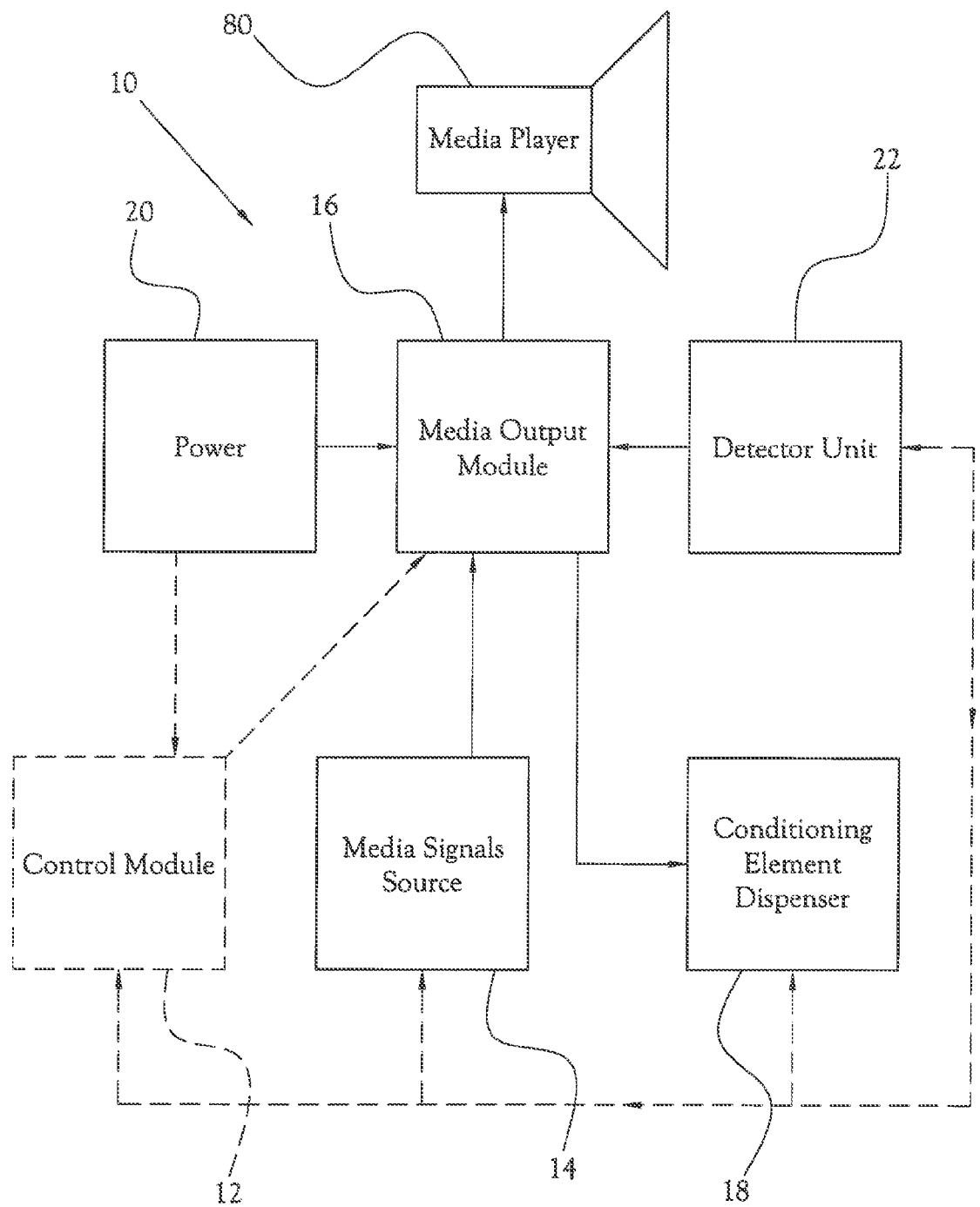
FIG. 1 is a block diagram of a counter-conditioning system according to an example embodiment of the present general inventive concept.

FIG. 1 is a block diagram of a counter-conditioning system according to an example embodiment of the present general inventive concept. In the example embodiment of FIG. 1, an example counter-conditioning device 10 includes a media output module 16, a detector unit 22, and a conditioning element dispenser 18. Although the illustrated components may be shown as separate units for convenience of illustration, it is possible that the various components may be formed into one or more integrated units, or various combinations of units. For example, the sound generation system (e.g., speakers and/or media player) may be co-located with the conditioning element dispenser, including the detector unit and media source, into one or more integrated units, or various combinations of units. The media player may be any known or later developed type of audio/video device such as a home theatre system, stereo system, television system, radio, DVD/CD player, etc. In the illustrated embodiment, the detector unit 22 and conditioning element dispenser 18 are communicably coupled to the media output module 16. The device 10 may further include a power source 20 provided to one or more of the media output module 16, detector unit 22, and/or conditioning element dispenser 18. The media output module 16 is further communicably coupled to a first and second media signals source 14. In some embodiments, a control module 12 is communicably coupled to media output module 16, detector unit 22, conditioning element dispenser 18, and/or the first and second media signals source 14 to collectively control their respective functions. In other embodiments, each of the media output module 16, detector unit 22, conditioning element dispenser 18, and/or media signals source 14 each have an independent controller for controlling their respective functions.

In operation, the conditioning element dispenser 18 is configured to dispense a conditioning element when instructed to do so, according to various selection criteria. Example criteria are discussed below in the connection with FIG. 3, but the present general inventive concept is not limited to any particular sequence of event flow. As user herein, the term conditioning element broadly refers to anything pleasant or pleasing to the animal, such as, for example, a consumable item (e.g., food, treat, or liquid), a toy, scent, sound, or other perceived reward. In some embodiments, a receptacle (not shown) is disposed to receive a dispensed conditioning element from the conditioning element dispenser 18 and present the conditioning element such that it is accessible by the animal.

In some embodiments, the detector unit 22 detects activity of the animal with respect to the dispensed conditioning element. For example, the detector unit 22 can detect the present of the animal proximate the device 10, conditioning element dispenser 18, and/or optional receptacle to determine whether the animal has consumed the conditioning element. It is also possible for the detector unit 22 to detect the presence and/or absence of a dispensed conditioning element, as well as a quantity of conditioning element, of the dispenser, to indicate activity of the animal with respect to the dispensed conditioning element, e.g., to determine if the conditioning element has been consumed. In addition, the detector unit 22 can generate an indicator signal when the animal accesses a conditioning element from the device 10. For example, when the conditioning element dispenser dispenses a conditioning element, the detector unit 22 can detect whether the animal has accessed the conditioning element by detecting the presence and/or absence of the dispensed conditioning element, determining a quantity of conditioning element consumed, and/or detecting the presence of the animal proximate the dispensed conditioning element, or some combination thereof. Examples of the detector unit 22 include, but are not limited to, a motion detector, a pressure/weight sensor, an image-based system, infrared detector, volume detector, or other known or later developed detection systems.

Referring to FIG. 1, a media signals source 14 can be connected to a media output module 16 to provide the media output module 16 with at least a first and second media signal. The media signals source 14 and the media output module can be formed as separate units, combined with other units, or can be integrated as a single unit. For convenience of description, the first and second media signals are generally referred to as a conditioning media signal and an anxiety-inducing media signal. The conditioning media signal is generally a neutral or comforting media signal for the animal that the device 10 associates with the dispensation of a conditioning element. The conditioning media signal can be a designated tone or audio recording, such as a human voice, or an image or video display, such as the animal's owner, a pleasing scent, or any combination thereof. The anxiety-inducing media signal, which is different than the conditioning media signal, is generally regarded as an unfavorable sensation, sound or image to the animal, such as fireworks, thunderstorms, gunshots, doorbells, intruders, other animals, other persons, etc., but is not limited thereto. Those skilled in the art will appreciate that the present general inventive concept is not limited to any particular type of event or media signal, and that various other types of media signals and/or conditioning elements may be used without departing from the scope or spirit of the present general inventive concept. In some example embodiments, the media output module 16 can deliver the first and second media signals to the media player 80, which may be an pre-existing radio or speaker system used in a household, such as home theatre systems, stereo systems, television systems, radios, etc. The media output module 16 can also include an output to deliver the first and second media signals to the media player 80, using wired or wireless communication systems.

Figure 2:
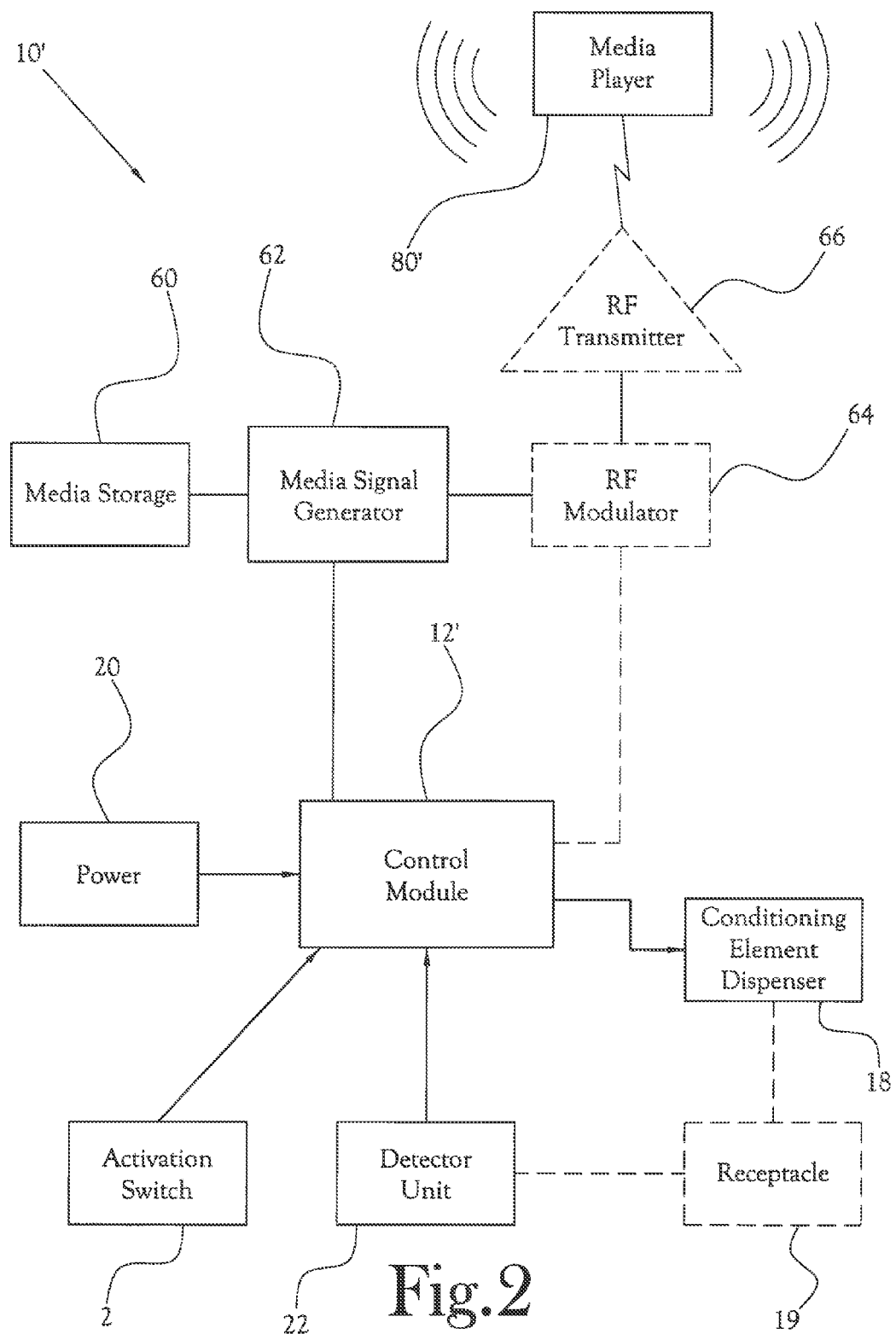
FIG. 2 is a block diagram of a counter-conditioning system according to another example embodiment of the present general inventive concept.

FIG. 2 is a block diagram of a counter-conditioning system configured in accordance with an example embodiment of the present general inventive concept. As illustrated in FIG. 2, the media player 80 can be communicably coupled to the media output module 16 via an audio and/or video cable, or via a wireless connection, such as Bluetooth and/or a radio frequency (RF) modulator/transmitter. In some embodiments, the media player 80 can be integrated with other components of the counter-conditioning device 10', such as an on-board video monitor and/or speaker/amplifier arrangement. The device 10' can include a communication unit, such as RF transmitter 66, to communicate media signals to and/or from the media player. The communication unit can also be configured to communicate information about the occurrence of particular events, such as dispensation/consumption of conditioning elements, generation of media signals, execution of system operations, and the like, over a network to a user, for viewing and/or device control purposes.

In some embodiments, the media signals source 14 can include, or connect to a media storage unit 60 to fetch and deliver the media signals (e.g., $1^{st}$ and/or $2^{nd}$ media signals) to the media output module 16 and media player 80, or the media signals can be received from a number of different sources, such as a personal media player, CD, DVD, internet source, or other known or later developed media sources. Those skilled in the art will appreciate that the media signals source 14 can include a group of individual media signal sources, or can be formed as a single unit capable of generating the desired media signals, such as conditioning media signals and anxiety inducing media signals. In addition, as discussed above in connection with FIG. 1, the illustrated components may be formed into one or more integrated units, or various combinations of units. For example, the sound generation system (e.g., speakers and/or media player) may be co-located with the conditioning element dispenser, including the detector unit and media source, into one or more integrated units, or various combinations of units. Accordingly, the present general inventive concept is not limited to a remote sound system requiring RF modulation and RF transmission to a remote media player, and may include the sound generation system and treating device in one package.

Referring to FIG. 2, the control module 12' can instruct the conditioning element dispenser 18 to dispense a conditioning element upon satisfaction of one or more predetermined conditions, or upon activation or re-set of the device 10', and can control the detector unit 22 to determine whether the animal has interacted with, or taken, the dispensed conditioning element. In the example embodiment, a power source 20 is provided to power the control module 12', and an activation switch 2 is provided to initiate the control module. Control buttons can also be provided to record particular media signals, or to select from an assortment of prerecorded media signals, for delivery to the media player 80. In some embodiments, the activation switch 2 can cause the media output unit to output a conditioning media signal, and/or to cause the conditioning element dispenser 18 to dispense a conditioning element.

As illustrated in FIG. 2, the control module 12' is connected to the media signal generator 62. The control module 12' can control operations of the media signal generator. For example, the control module 12' can select certain media signals from the media storage, can control volume of the device 10', and can actuate time delays, in accordance with predetermined routines of the device. Those skilled in the art will appreciate that although the media source 60 and media signal generator 62 are illustrated as separate components, it is possible to form these components as a single unit, or to combine them with other or additional components, with departing from the present general inventive concept. In some embodiments, the media signal generator 62 can be connected to the external media player 80' via an RF modulator 64 and corresponding RF transmitter 66, such as an FM modulator and/or FM transmitter. The control module 12' can control operation of the communication unit (e.g., RF modulator and/or RF transmitter) to communicate media signals to a remote media player and/or communicate media signals or other information over a network for access/device control by a user. The communication unit can also be configured to communicate media signals over a network to remote training devices to remotely train remote animals over a network.

The control module 12' in the presently illustrated example embodiment provides centralized instruction to the device's various components in order to control their respective functions. For example, the control module 12' may direct the conditioning element dispenser 18 to dispense a conditioning element according to various selection criteria. In some embodiments, the control module 12' instructs the dispenser 18 to dispense a conditioning element after instructing the conditioning tone output module 15 to deliver a conditioning tone and after the conditioning tone output module 15 actually delivers the conditioning tone. In some embodiments, the control module considers whether the detector unit 22 has determined that the animal has taken a previously dispensed conditioning element prior to instructing the dispenser to dispense another conditioning element, and/or prior to instructing the media signal generator 62 to deliver a media signal to the sound system 80' and, in turn, the animal.

Figure 3:
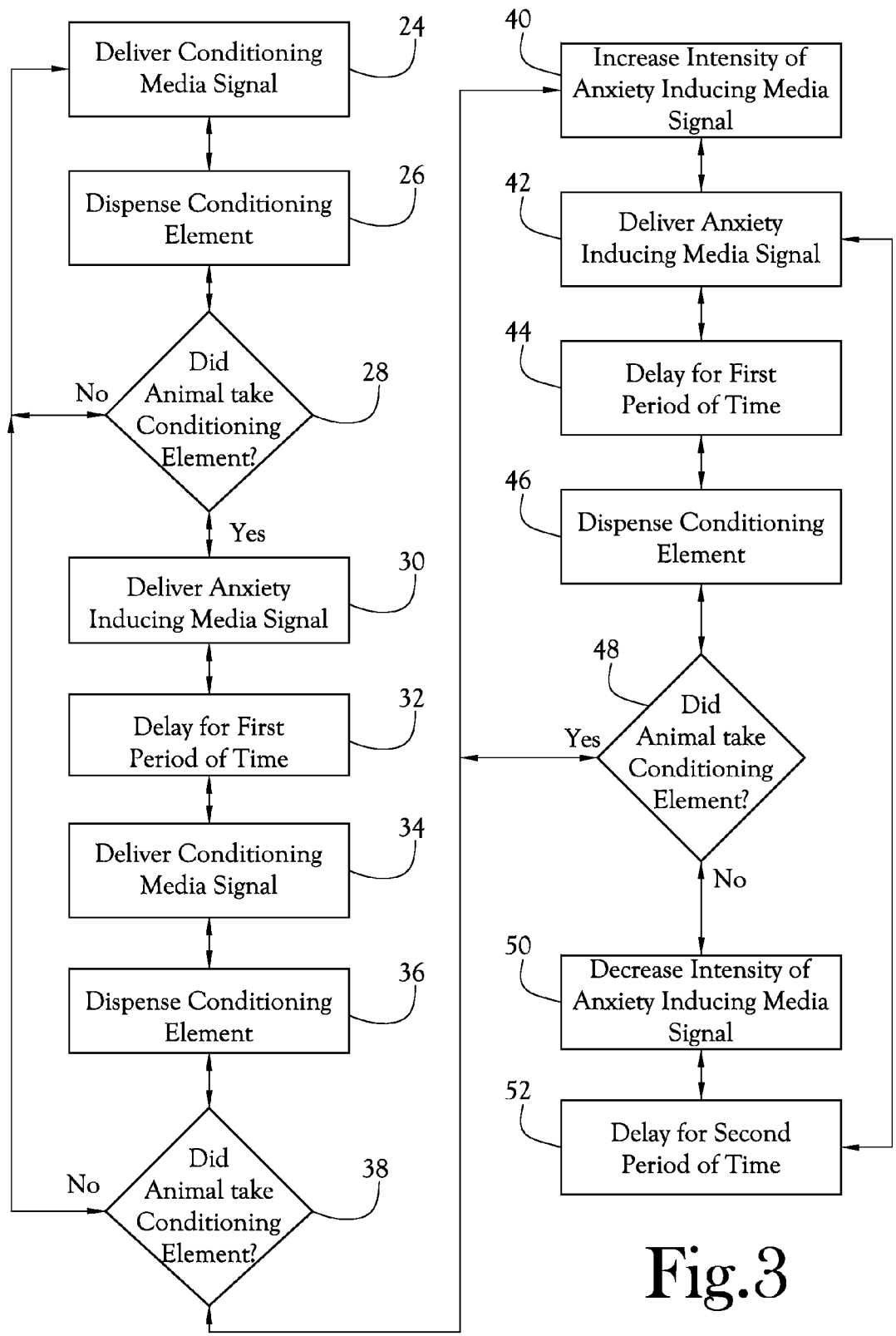
FIG. 3 is a flow diagram illustrating an example method implemented by an example counter-conditioning device according to an example embodiment of the present general inventive concept.

FIG. 3 is a flow diagram illustrating an example method implemented by an example counter-conditioning device according to an example embodiment of the present general inventive concept. FIG. 3 is an example of how the system can be sequenced to achieve desensitization of an anxiety producing sound, but the present general inventive concept is not limited to any particular sequence, as indicated by the double arrows leading to and from each operational block. Thus, the order and timing of activation of the individual flow blocks may be altered based on characteristics of a particular animal, such as the pet's temperament, the vet's prescribed protocol, etc., and the example operations and sequences illustrated in FIG. 3 should not be viewed as the only protocol that may work in desensitizing a pet. For example, certain dogs may react better to dispensation of a conditioning element prior to, simultaneously with, or after delivery of a particular media signal, and certain dogs (e.g., timid dogs) may react better to decreased intensities of a particular media signal, at different points of a training program, as opposed to increased intensities. It is also possible to deliver a particular media signal (conditioning or anxiety inducing) at various intensities before a conditioning element is dispensed, or at other stages of a selected training routine. Thus, embodiments of the present general inventive concept can be selectively tailored by a user based on characteristics of a particular animal, enabling the user to provide various orders, timings, and levels of a particular media signal, as well as various timings of dispensing conditioning elements relative to delivery of particular media signals, without departing from the broader scope and spirit of the present general inventive concept.

In the example routine of FIG. 3, after the device 10 is activated, for example, by a user engaging the activation switch 2, a first media signal, such as a conditioning media signal, is delivered to the media player 80, which then delivers it to the animal, in operation 24. To carry out this operation, the media output terminal 16 can receive and/or access a first media signal and deliver it to the media player 80 or 80'. The control module can instruct the media signal generator 62 to access a first media signal from the media storage 60, and deliver that signal to a media player 80 or 80'. After the conditioning signal is delivered, the conditioning element dispenser 18 dispenses a conditioning element, in operation 26. In operation 28, the detector unit 22 determines whether the animal has taken the dispensed conditioning element. When the detector unit 22 does not indicate that the animal has taken the conditioning element, it is determined that the animal does not yet associate the conditioning media signal with the dispensation of the conditioning element. As a result, operation 24 is repeated, and the conditioning media signal is again delivered to the animal. If the detector unit 22 indicates that the animal has taken the dispensed conditioning element, it is determined that the animal does associate the conditioning media signal with the dispensation of the conditioning element.

When it has been determined that the animal associates the conditioning media signal with the dispensation of a conditioning element, an anxiety-inducing media signal is delivered to the animal, in operation 30. In operation 32, a delay occurs for a first predetermined period of time. After the delay, the conditioning media signal is delivered to the media player 80 to play the conditioning media signal to the animal, in operation 34. After the conditioning media signal is delivered to the animal, the control module instructs the conditioning element dispenser 18 to dispense another conditioning element, in operation 36. Here, the delay for the first predetermined period of time conditions the animal to associate the occurrence of the anxiety-inducing media signal with a small delay, followed by the occurrence of the conditioning media signal and ultimately the dispensation of a conditioning element. This delay prevents the animal from becoming anxious when the conditioning media signal and/or a conditioning element does not immediately follow the occurrence of the anxiety-inducing media signal, especially, after the desensitization training is complete and the device 10 is not currently being used.

After the dispenser 18 dispenses a conditioning element at operation 36, the detector unit 22 determines whether the animal takes the dispensed conditioning element, in operation 38. When the detector unit 22 does not indicate that the animal has taken the dispensed conditioning element, it is determined that the animal does not yet associate the anxiety-inducing media signal with the conditioning media signal and the dispensation of a conditioning element. As a result, the conditioning media signal is again delivered to the media player and animal, by repeating operation 24. However, when the detector unit 22 indicates that the animal has taken the dispensed conditioning element, it is determined that the animal does associate the anxiety-inducing media signal with the conditioning media signal and the dispensation of a conditioning element.

When it has been determined that the animal associates the anxiety-inducing media signal with the conditioning media signal and the dispensation of a conditioning element, the intensity and/or strength of the anxiety-inducing media signal is increased, as illustrated at 40, and delivered to the media player 80 to play the enhanced anxiety-inducing media signal to the animal, in operation 42. In situations where an audio signal is utilized, it is possible to increase the intensity and/or strength of the audio signal, thereby increasing the audio's volume. Additionally, when an image/video signal is utilized, the intensity and/or strength of the image/video signal is increased, thereby increasing a visual characteristic (e.g., brightness or clarity) of the image/video. In some embodiments, the intensity and/or strength of the anxiety-inducing media signal can be increased such that it is delivered to the animal with substantially the same characteristics (e.g., volume, brightness and clarity) as the corresponding actual occurrence of the sensation delivered through the media signal. For example, when the anxiety-inducing media signal is a thunder sound, the volume of the thunder sound is increased to the level of naturally occurring thunder. The intensity and/or strength of the anxiety-inducing media signal can be controlled to condition the animal to the characteristics of the corresponding, actual anxiety-inducing sensation.

After the anxiety-inducing media signal of increased intensity/strength is delivered, a delay occurs for the first predetermined period of time, in operation 44. In operation 46, the conditioning element dispenser 18 dispenses a conditioning element, and the detector unit 22 determines whether the animal takes the dispensed conditioning element, in operation 48. When the detector unit 22 determines that the animal has not taken the conditioning element, it is determined that the animal does not yet fully associate the anxiety-inducing media signal, or at least the anxiety-inducing media signal of increased intensity/strength, with the dispensation of the conditioning element. Accordingly, the intensity/strength of the anxiety-inducing media signal is decreased, in operation 50, followed by a delay for a second predetermined period of time, in operation 52. The second predetermined period of time is more extensive than the first. The second period of time can function to effectively end the training session and provide the animal with a break from the anxiety-inducing media signal, such that the counter-conditioning does not become counter productive and cause the animal unnecessary anxiety. The device 10 can deliver the anxiety-inducing media signal of decreased intensity/strength again, as illustrated at 42, as needed to effectively desensitize the animal.

When the presence detector 22 indicates that the animal has taken the conditioning element after the anxiety-inducing media signal of increased intensity/strength is delivered, it is determined that the animal associates the anxiety-inducing media signal of increased intensity/strength with the dispensation of the conditioning element. As a result, the intensity/strength of the anxiety-inducing media signal is further increased, in operation 40, and the enhanced anxiety-inducing media signal is delivered to the animal, in operation 42. The dispenser 18 then dispenses a conditioning element following a delay, as illustrated at operations 44-46. The device 10 continues to execute the loop of actions at 40-46 until the delivered anxiety-inducing media signal exhibits characteristic levels desired by the user, which are typically substantially that of the actual anxiety-inducing occurrence.

As described herein, operations 24-28 generally function to condition the animal to associate the occurrence of the conditioning media signal with the dispensation of a conditioning element, and operations 30-38 generally function to condition the animal to associate the occurrence of the anxiety-inducing media signal with both the occurrence of the conditioning media signal and the dispensation of a conditioning element. Operations 40-48 generally function to condition the animal to associate the anxiety-inducing media signal of increased intensity/strength with the dispensation of a conditioning element. That is, the device 10 associates the conditioning media signal to the conditioning element, associates the anxiety-inducing media signal with both the conditioning media signal and the conditioning element, associates the anxiety-inducing media signal with the conditioning element, and ultimately associates the anxiety-inducing media signal having characteristic levels commensurate with an actual anxiety-inducing occurrence with the dispensation of the conditioning element. Accordingly, the device 10 counter-conditions the animal to respond to the occurrence of the anxiety-inducing media signal with anticipation of a neutral or pleasant occurrence instead of anxiety, thus desensitizing the animal to the anxiety-inducing sensation, and accomplishes the desensitization of the animal with minimal active participation by the user.

Some embodiments provide a counter-conditioning device and method of desensitizing an animal to an anxiety-inducing event, minimizing a user's active involvement in such desensitization. In some embodiments, the device can automatically condition the animal to associate the occurrence of a conditioning media signal with the dispensation of a conditioning element, such as a pet treat or toy. The device can output, or deliver, the conditioning media signal and subsequently dispense a conditioning element. The device can detect whether the animal has taken (or consumed) the conditioning element to determine whether the animal associates the conditioning media signal with the dispensation of the conditioning element. When the animal makes the association, the device can condition the animal to associate the occurrence of an anxiety-inducing media signal with the occurrence of the conditioning media signal and the dispensation of a conditioning element, by delivering the anxiety-inducing media signal, followed by the conditioning media signal, and ultimately dispensing a conditioning element. The device can detect whether the animal accesses the conditioning element to determine whether the animal associates the anxiety-inducing media signal with the conditioning media signal and the dispensation of a conditioning element. When the animal makes this association, the device can automatically condition the animal to associate the occurrence of the anxiety-inducing media signal of increased intensity and/or strength with the dispensation of a conditioning element. The device can increase the intensity, strength, or both of the anxiety-inducing media signal and can deliver the anxiety-inducing media signal of increased intensity and/or strength, followed by the dispensation of a conditioning element. The device can again detect whether the animal accesses the conditioning element to determine whether the animal associates the anxiety-inducing media signal with the dispensation of a conditioning element. The device can continue to increase the intensity and/or strength of the anxiety-inducing media signal until it reaches the characteristics of a corresponding, actual anxiety-inducing occurrence. However, in the event the animal does not continue to take the dispensed conditioning elements as the intensity and/or strength of the anxiety-inducing media signal increases, the device can decrease the intensity and/or strength of the anxiety-inducing media signal until the animal associates the anxiety-inducing media signal of increased intensity and/or strength with the dispensation of a conditioning element. These routines can be repeated or terminated as desired to provide an animal training program with minimal owner/user intervention.

Example embodiments of the present general inventive concept can be achieved by providing an animal training system to desensitize an animal to an anxiety-inducing event or sound. The system can generate an anxiety-inducing media representative of an anxiety-inducing event. The system can include a conditioning element dispenser to selectively dispense a conditioning element, a detector unit to determine if the animal has taken a dispensed conditioning element, and a media output module to selectively output one of a first media signal and a second media signal, the first media signal being different than the second media signal, wherein at least one of the first and second media signals is output based on whether the animal has taken the dispensed conditioning element, and the conditioning element dispenser dispenses a conditioning element in response to the first media signal, the second media signal, or both.

The first and second media signal can be selectively output to an external media player, such as a home stereo system, speaker system, radio system, theatre system, television system, or combinations thereof.

The media output module can be connected to the external media player via a radio frequency (RF) modulator and/or RF transmitter.

In view of the above discussion, the method for counter-conditioning the animal is automated such that the device automatically conditions the animal with effectively no training conducted by the user. Accordingly, the device and method minimize the user's active involvement in the training such that the animal is conditioned with limited time invested by the user.

From the foregoing description, those skilled in the art will recognize that a counter-conditioning device and method for desensitizing an animal to an anxiety-inducing media signal offering advantages over the prior art has been provided. For example, the device and method can be used for conditioning an animal that exhibits anxiety in response to the occurrence of a particular sensation such that the animal learns to anticipate a neutral or present response to the occurrence of the anxiety-inducing sensation. The device conducts this conditioning such that a user is not actively involved in the training process to the extent that the user is not required to invest extensive amounts of time to the training.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Embodiments of the present general inventive concept can be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, flash memory, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Example embodiments of the present general inventive concept can also be achieved by providing a method of desensitizing an animal to an anxiety inducing event, including providing an output unit to communicate with a media player to cause the media player to output a conditioning media signal and an anxiety inducing media signal, providing a conditioning element dispenser to dispense a conditioning element, providing a detector to determine when an animal has taken the conditioning element, and providing a control module to control operation of the media player and the conditioning element dispenser such that the media player outputs the conditioning media signal and the conditioning element dispenser subsequently dispenses a first conditioning element, and when the detector determines that the animal has taken a dispensed conditioning element, the media player outputs the anxiety inducing media signal and subsequently outputs the conditioning media signal, and the conditioning element dispenser dispenses a second conditioning element from the conditioning element dispenser.

Example embodiments of the present general inventive concept can also be achieved by providing a system to desensitize an animal to an anxiety inducing event, including a conditioning element dispenser to dispense a conditioning element, a detector to determine if the animal has taken a dispensed conditioning element, a media signal generator to provide a conditioning media signal and an anxiety inducing media signal, the anxiety inducing media signal corresponding to an anxiety inducing event, a communication unit to communicate with a media player, and a control module to control operation of the media player and the conditioning element dispenser such that the media player receives an instruction from the control module to output the conditioning media signal and the conditioning element dispenser receives an instruction from the control module to subsequently dispenses a first conditioning element, and when the detector determines that the animal has taken a dispensed conditioning element, the media player receives an instruction from the control module to output the anxiety inducing media signal and to subsequently output the conditioning media signal and the conditioning element dispenser receives an instruction from the controller to dispense a second conditioning element from the conditioning element dispenser.

While the present general inventive concept has been illustrated by description of several embodiments and while the illustrative embodiments have been described in considerable detail, applicant is not restricting or in any way limiting the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's present general inventive concept.

The invention claimed is:

1. A method of desensitizing an animal to an anxiety inducing event, the method comprising:
providing an output unit to communicate with a media player to cause the media player to output a conditioning media signal and an anxiety inducing media signal;
providing a conditioning element dispenser to dispense a conditioning element;
providing a detector to determine when an animal has taken the conditioning element; and
providing a control module to selectively control operation of the output unit and the conditioning element dispenser;
delivering a first conditioning element from the conditioning element dispenser based upon the media player outputting the conditioning media signal, and when the detector determines that the animal has taken the first conditioning element, the output unit causes the media player to output the anxiety inducing media signal followed by the conditioning media signal, and the conditioning element dispenser dispenses a second conditioning element based upon output of the anxiety inducing media signal.

2. The method of claim 1, wherein the control unit causes the media player to output an anxiety inducing media signal before the first conditioning element is dispensed.

3. The method of claim 1, wherein the output unit, the media player, conditioning element dispenser, detector, and controller are formed as an integrated unit.

4. The method of claim 1, wherein the output unit includes a communication unit to communicate with an external media player via a wired and/or wireless connection.

5. The method of claim 4, wherein the output unit is configured to communicate with the external media player over a network.

6. The method of claim 5, wherein the controller is configured to generate training data corresponding to operation of the media player and the conditioning element, and the communication unit is configured to communicate the training data to a remote user over the network.

7. The method of 1, wherein the control module causes the media player to modify an intensity of the anxiety inducing media signal when the detector determines that the animal has taken the conditioning element.

8. The method of claim 7, wherein the control module activates the conditioning element dispenser to dispense a third conditioning element in association with the modified anxiety inducing media signal.

9. The method of claim 8, wherein the control module causes the media player to modify the intensity of the anxiety inducing media signal when the detector determines that the animal has not taken the third conditioning element.

10. The method of claim 9, wherein the control module ends a training session when the control module modifies the intensity of the anxiety inducing sound beyond a predetermined level.

11. The method of claim 1, wherein the detector determines whether the animal has taken a dispensed conditioning element by measuring a volume and/or weight of conditioning element corresponding to the conditioning element dispenser.

12. The method of claim 1, wherein the media player is an external media player in communication with the communication unit via a wired and/or wireless connection.

13. The method of claim 12, wherein the external media player is a stereo system, audio system, radio system, home theatre system, television system, video system, or combination thereof.

14. The method of claim 12, wherein the output unit is connected to the external media player via a radio frequency (RF) modulator and/or RF transmitter.

15. The method of calim 1 wherein the control module comprises an activation switch to instruct the media player to output the conditioning media signal to instruct the conditioning element dispenser to dispense a conditioning element.

16. The method of claim 1, wherein at least one of the conditioning media signal and the anxiety inducing media signal is an audio signal, a video signal, or combination thereof.

17. The method of claim 1, wherein the output unit includes a recording device to record the anxiety inducing media signal.

18. The method of claim 1, wherein the conditioning media signal and/or the anxiety inducing media signal are provided from a personal media device and/or from an internet source.

* * * * *